United States Patent [19]

Sakai

[11] Patent Number: 4,729,264
[45] Date of Patent: Mar. 8, 1988

[54] SYSTEM FOR CONTROLLING THE PRESSURE OF OIL IN A SYSTEM FOR A CONTINUOUSLY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 879,663

[22] Filed: Jun. 27, 1986

[30] Foreign Application Priority Data

Jun. 29, 1985 [JP]  Japan .................................. 60-143468

[51] Int. Cl.⁴ ............................................. B60K 41/12
[52] U.S. Cl. .......................................... 74/868; 74/864; 74/867
[58] Field of Search ............... 74/868, 867, 866, 864, 74/861, 877; 474/11, 12, 18, 28

[56] References Cited

U.S. PATENT DOCUMENTS

| | | | |
|---|---|---|---|
| 3,451,283 | 6/1969 | Rattunde ............................ | 474/18 |
| 3,893,344 | 7/1975 | Dantlgraber et al. ............... | 474/12 |
| 4,152,947 | 5/1979 | van Deursen et al. ............. | 474/11 |
| 4,161,894 | 7/1979 | Giacosa ............................. | 474/28 |
| 4,369,675 | 1/1983 | Van Deussen ..................... | 74/864 |
| 4,387,608 | 6/1983 | Mohl et al. ......................... | 474/18 |
| 4,400,164 | 8/1983 | Cadee ................................. | 474/12 |
| 4,458,318 | 7/1984 | Smit et al. ......................... | 474/18 |
| 4,459,879 | 7/1984 | Miki et al. ......................... | 74/867 |
| 4,462,275 | 7/1984 | Mohl et al. ......................... | 74/866 |
| 4,466,521 | 8/1984 | Hattori et al. ..................... | 74/866 X |
| 4,475,416 | 10/1984 | Underwood ....................... | 474/18 |
| 4,509,125 | 4/1985 | Fattic et al. ....................... | 74/866 X |
| 4,510,822 | 4/1985 | Yamamuro et al. ............... | 474/11 |
| 4,534,243 | 8/1985 | Yokoyama et al. ............... | 74/867 X |
| 4,547,178 | 10/1985 | Hayakawa et al. ............... | 74/867 X |
| 4,559,850 | 12/1985 | Sakakibara ........................ | 74/866 X |
| 4,565,110 | 1/1986 | Ito ...................................... | 74/867 X |
| 4,584,907 | 4/1986 | Niwa et al. ........................ | 74/866 |
| 4,612,828 | 9/1986 | Ide et al. ............................ | 74/877 |

Primary Examiner—Lawrence Staab
Assistant Examiner—David Novais
Attorney, Agent, or Firm—Martin A. Farber

[57] ABSTRACT

A control system for a continuously variable transmission has a line pressure control valve having ports and a spool for controlling the line pressure of oil supplied to a cylinder of a drive pulley. The line pressure control valve has chambers at opposite sides of the spool. A spring is provided between one end of the spool and a slidable spring retainer. By controlling the pressure of oil supplied to the end of the spool and the force of the spring in accordance with engine operating conditions, the line pressure is controlled.

7 Claims, 5 Drawing Figures

SYSTEM FOR CONTROLLING THE PRESSURE OF OIL IN A SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the line pressure in a hydraulic circuit for the transmission.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a line pressure control valve and a transmission ratio control valve. Each valve comprises a spool to control the oil supplied to the servo devices.

The transmission ratio control valve operates to determine the transmission ratio in accordance with the opening degree of the throttle valve of the engine and the speed of the engine. The line pressure control valve is adapted to control the line pressure in accordance with the transmission ratio and the engine speed. The output of the engine is transmitted to the drive pulley through a clutch. The line pressure is controlled to prevent the belt from slipping on the pulleys in order to transmit the output of the engine.

At the start of the vehicle, the transmission ratio is set at a maximum value. When the vehicle speed and engine speed reach set values under a driving condition, the transmission ratio starts to change (upshift). At that time if the engine speed is kept constant, the transmission ratio is automatically and continuously reduced at a speed which is determined by the line pressure, the pressure of oil supplied to the servo device of the drive pulley, and the actual transmission ratio.

In such a system, it is preferable to shift the spool of the line pressure control valve by a control oil supplied to an end of the spool and to control the line pressure by controlling the amount of the control oil. The control of the amount of the control oil is carried out by controlling the draining of the control oil by a solenoid operated valve which is intermittently operated by pulses. Thus, by controlling the duty ratio of the pulses, the line pressure is controlled to its necessary value.

However, a small variation of the pressure of the control oil causes a large variation of the line pressure. For example, a variation of 4 Kg/cm$^2$ in the control oil pressure causes a variation of 20 Kg/cm$^2$ in the line pressure. Accordingly, if the viscosity of the control oil changes dependent on the change of temperature, the line pressure greatly changes. Therefore, the system must be provided with temperature compensating means, which renders the system complicated in construction.

SUMMARY OF THE INVENTION

The object of the present invention is to provide a system for a continuously variable transmission, which controls the line pressure in a reliable manner without temperature compensation means.

To this end, in the system of the present invention, a spring is provided so as to shift a spool of a line pressure control valve in addition to the operation of control oil, so that control width by the control oil can be reduced.

According to the present invention, there is provided a control system for a continuously variable transmission for transmitting the power of an internal combustion engine, having a drive pulley having a hydraulically shiftable disc and a first hydraulic cylinder for shifting the disc, a driven pulley having a hydraulically shiftable disc and a second hydraulic cylinder for operating the disc of the latter, a belt engaged with both pulleys, a line pressure control valve having ports and a spool, a transmission ratio control valve having ports and a spool, a first hydraulic circuit having a pump for supplying oil to the first cylinder through the line pressure control valve and transmission ratio control valve and to an end of the spool of the line pressure control valve.

The system comprises a second hydraulic circuit for supplying oil to the other end of the spool of the line pressure control valve so as to shift the spool, control valve means provided in the second hydraulic circuit for controlling the amount of oil supplied to the other end of the spool of the line pressure control valve, sensing means for sensing operating conditions of the engine and the transmission and for producing signals dependent on the condition, first means responsive to the signals from the sensing means for producing a control signal for operating the control valve means so as to control the line pressure, a spring provided between the other end of the spool of the line pressure control valve and a slidable spring retainer, and second means for shifting the spring retainer in accordance with the transmission ratio so as to control the line pressure in addition to the operation of the control valve means.

The other objects and features of this invention will become understood from the following description with reference to the accompanying drawings.

DETAILED DESCRIPTION OF THE PREFERRED EMBODIMENT

Figure 1:
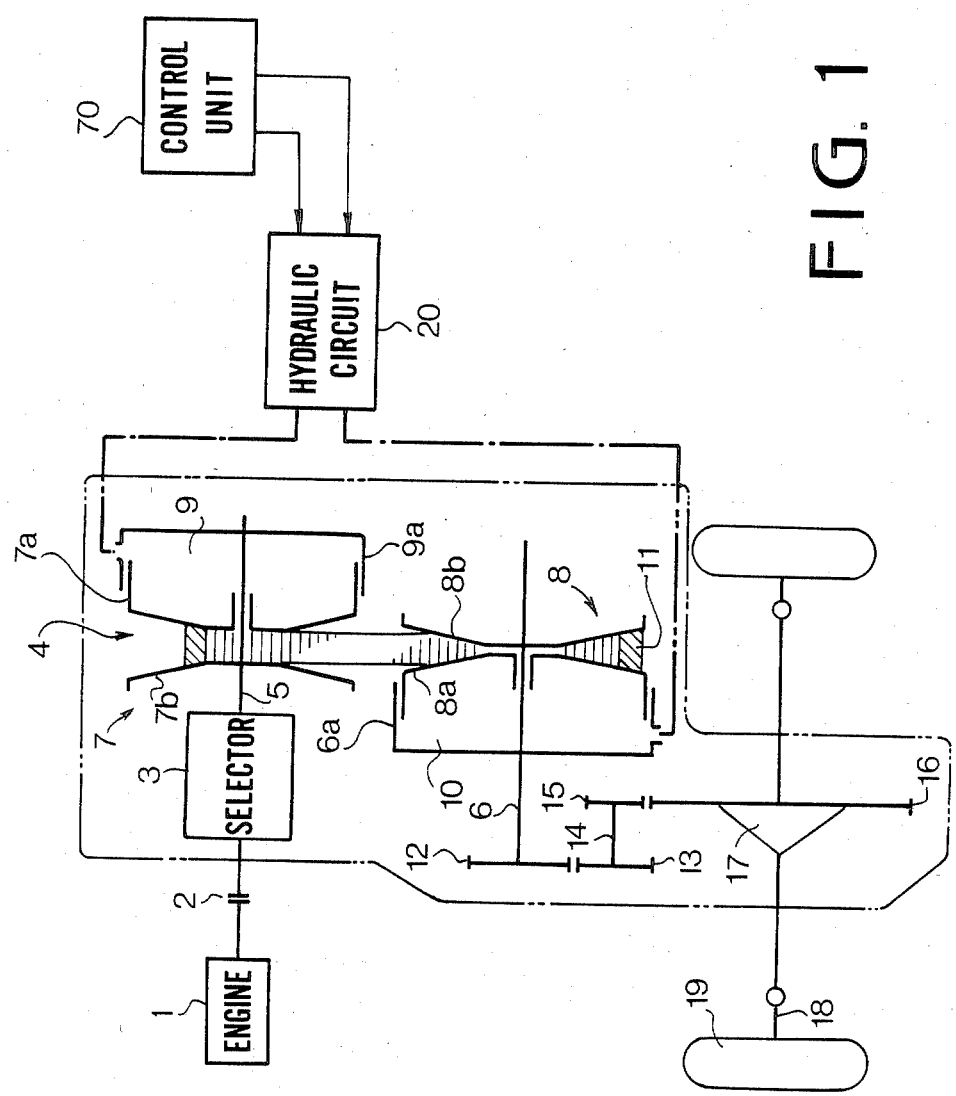
FIG. 1 is a schematic illustration of a continuously variable belt-drive transmission.

Referring to FIG. 1, the continuously variable belt-drive automatic transmission for a motor vehicle to which the present invention is applied, comprises an electromagnetic powder clutch 2 for transmitting the power of an engine 1 to transmission 4 through a selector mechanism 3.

The belt-drive transmission has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite the movable conical disc 8a which has a cylindrical portion which is slidably engaged in a cylinder 6a of the output shaft 6 to form a servo device. A chamber 10 of the servo device is also communicated with the hydraulic control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final reduction gear 16. The rotation of the final reduction gear 16 is transmitted to axles 18 of the vehicle driving wheels 19 through a differential 17.

Figure 2A:
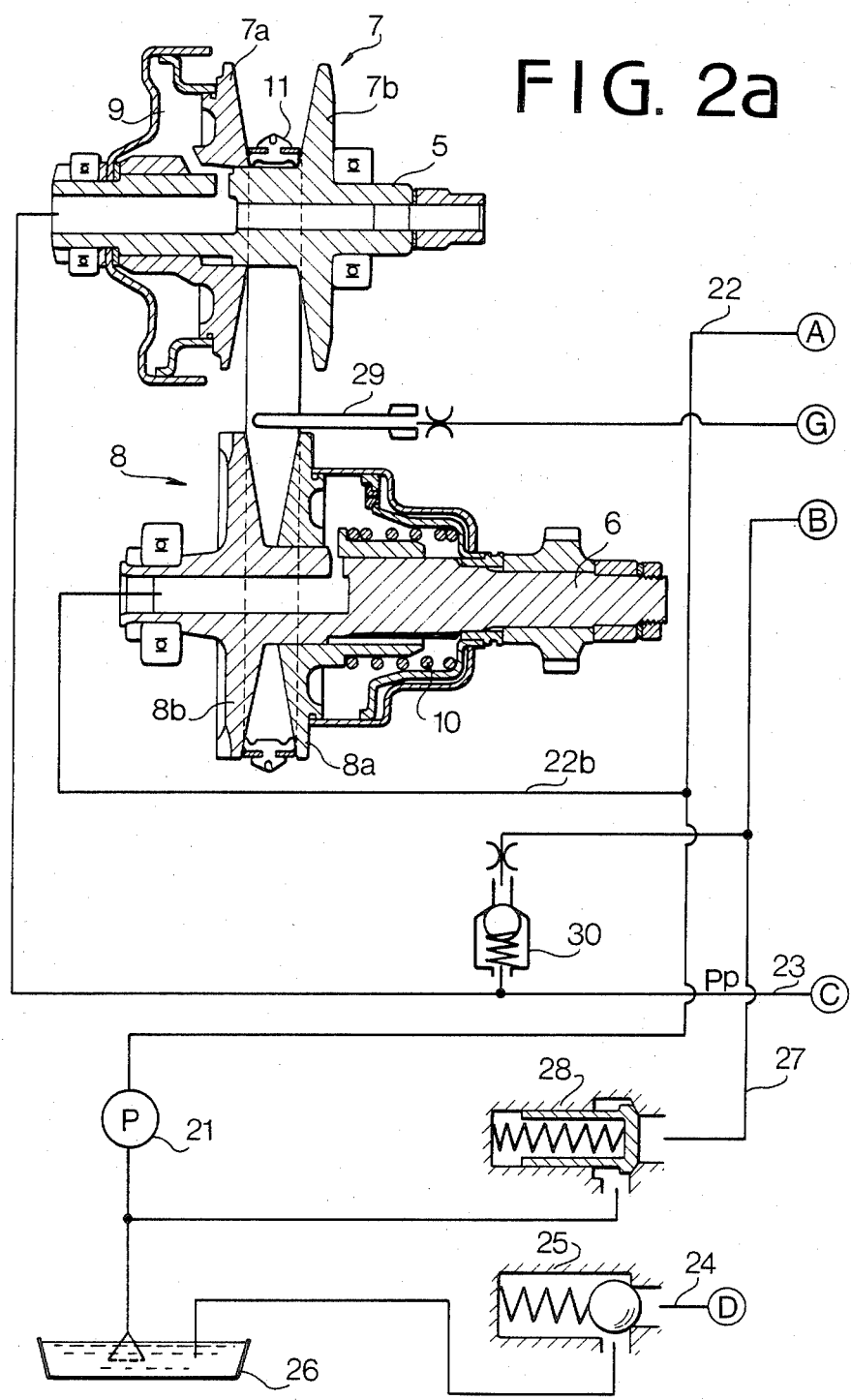
FIGS. 2a to 2c are schematic diagrams showing a control system according to the present invention.
Figure 2B:
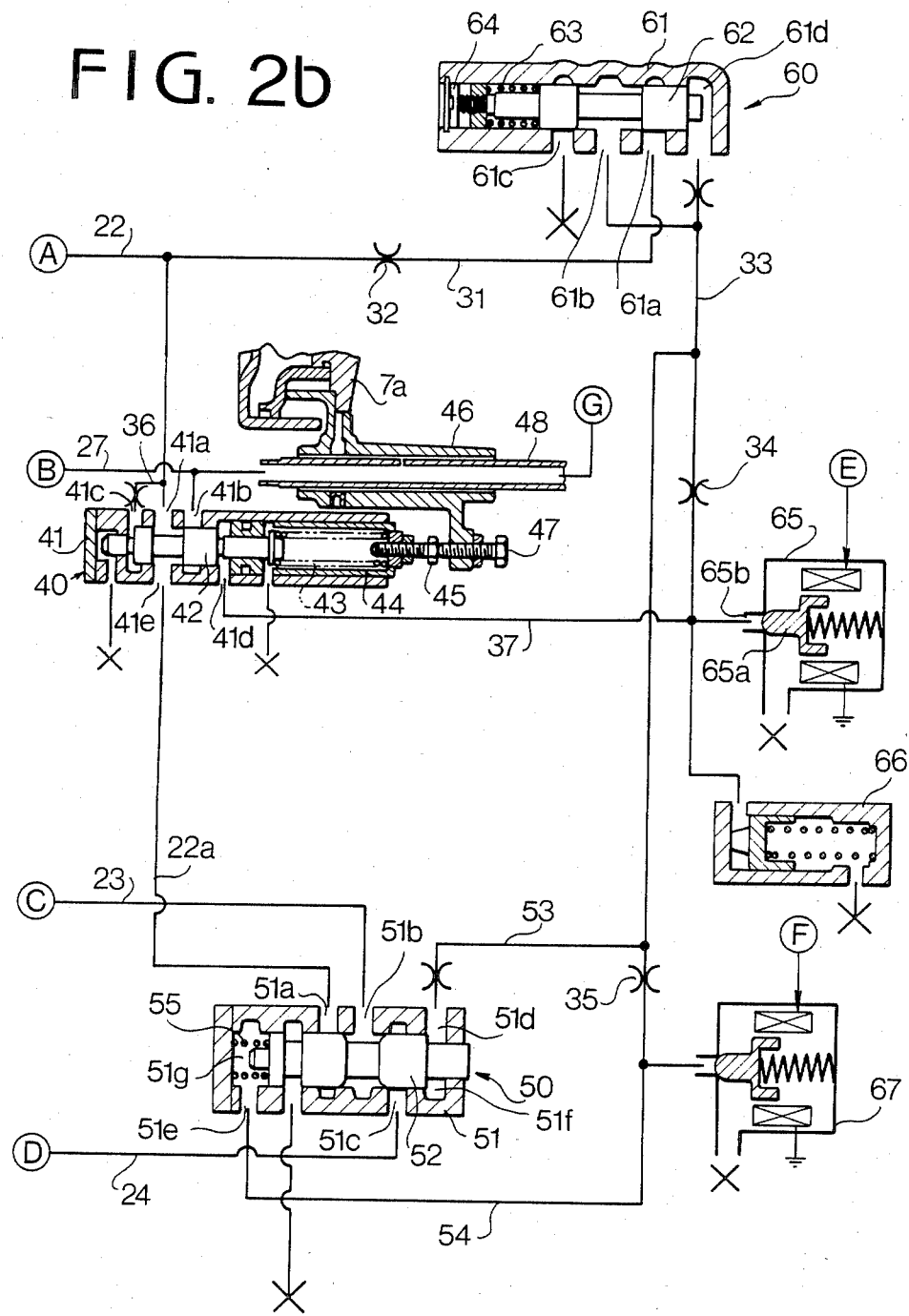
Figure 2C:
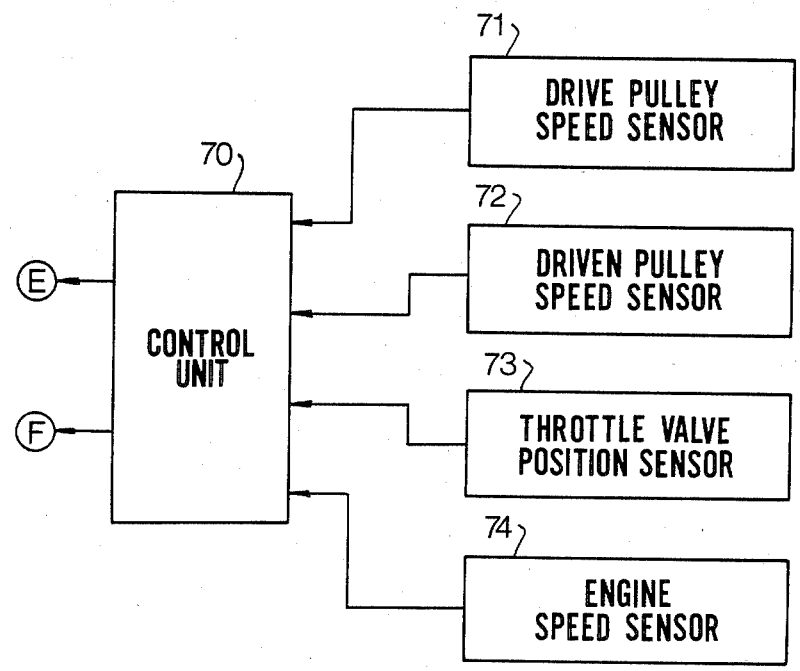

Referring to FIGS. 2a to 2c, the hydraulic control circuit 20 includes a line pressure control valve 40 and a transmission ratio control valve 50. The line pressure control valve 40 comprises a valve body 41, a spool 42, and ports 41a, 41b, 41c, 41d, 41e. The chamber 9 of the drive pulley 7 is applied with pressurized oil by an oil pump 21 from an oil reservoir 26 passing through a line pressure conduit 22, ports 41a and 41e of the line pressure control valve 40, the transmission ratio control valve 50, and conduit 23. The chamber 10 of the driven pulley 8 is applied with pressurized oil through the a passage 22b without passing through valves 40 and 50. The movable conical disc 7a of the drive pulley 7 is so designed that the pressure receiving area thereof is larger than that of movable conical disc 8a of the driven pulley 8.

In accordance with the present invention, the line pressure control valve 40 has an axially slidable spring retainer 44, a spring 43 provided between the spool 42 and the retainer 44, and an adjust screw 45 screwed in the spring retainer 44. The screw 45 engages with a screw 47 screwed in a transmission ratio sensing shoe 46 which is slidably mounted on a lubricating oil tube 48. The sensing shoe 46 is slidably engaged with either of the movable conical discs 7a and 8a (disc 7a in the illustrated embodiment), so that the axial movement of the disc 7a is transmitted to the spool 42 through the sensing shoe 46, the screws 47, 45, the spring retainer 44 and the spring 43. The spool 42 is applied with pressurized oil supplied to a chamber communicating with port 41c through a conduit 36. The spool 42 is urged to the left by the force of the spring 43. The port 41a is communicated with the port 41b of a drain passage 27 in accordance with the position of a land of the spool 42.

The transmission ratio control valve 50 comprises a valve body 51, spool 52, and spring 55 for urging the spool in the downshift direction. A port 51b of the valve body 51 is selectively communicated with a pressure oil supply port 51a or a drain port 51c in accordance with the position of lands of the spool 52. Port 51b communicates with the chamber 9 through the conduit 23, and port 51a communicates with line pressure control valve 40 through conduit 22a. The drain port 51c is communicated with the oil reservoir 26 through a conduit 24 and check valve 25. The drain port 41b of the line pressure control valve communicates with the oil reservoir 26 through the passage 27 and a lubricating oil pressure providing valve 28 in the form of a check valve. The passage 27 is further communicated with the conduit 23 through a check valve 30. A part of the oil in the passage 27 is supplied to the pulley 8 from a nozzle 29 passing through the tube 48 to lubricate the pulley device.

The system of the present invention is provided with a pressure reducing valve or pressure control valve 60, and solenoid operated on-off control valves 65 and 67. The pressure control valve 60 comprises a valve body 61, spool 62, ports 61a, 61b and 61c, end chamber 61d, and a spring 63 urging the spool 62 toward the chamber 61d. The load of the spring 63 can be adjusted by a screw 64. The port 61a is connected to the conduit 22 by a conduit 31 having an orifice 32, and the port 61b and chamber 61d are connected to a conduit 33. When the pressure in the conduit 33 reduces, the spool 62 is shifted to the right by the spring 63, so that the port 61a communicates with port 61b to increase the pressure in the conduit 33. Thus, a constant pressure of oil as the control oil is provided in the conduit 33.

The conduit 33 is communicated with the port 41d of the line pressure control valve 40 through an orifice 34 and a passage 37. The conduit 33 is also communicated with the reservoir 26 through the solenoid operated on-off valve 65 and with an accumulator 66. Further, the conduit 33 is communicated with an end chamber 51f of the port 51d of the transmission ratio control valve 50 through a passage 53 and with another end chamber 51g of the port 51e through a passage 54 having an orifice 35. The solenoid operated on-off valve 67 is connected to the passage 54 downstream of orifice 35 so as to drain the oil to the reservoir 26. The solenoid operated valve 65 is adapted to be operated by pulses. When energized, a valve 65a opens a drain port 65b. The solenoid operated valve 67 is the same as the valve 65 in construction and operation. The control valves 65 and 67 are operated by pulses from a control unit 70. Thus, control pressures applied to ports 41d, 51e are changed by changing duty ratios of the pulses supplied to the control valves 65 and 67.

In the line pressure control valve 40, the relationship among spring load $F_S$ and line pressure PL, line pressure receiving area SL of the spool, control pressure $P_d$ at the port 41d, and control pressure receiving area $S_d$ is as follows:

$$F_S + P_d S_d = PL \cdot SL$$

$$PL = (P_d S_d + F_S)/SL$$

Accordingly, the line pressure PL is proportional to the control pressure $P_d$.

The relationship between the duty ratio (D) of the pulses applied to the solenoid operated control valve 67 and the transmission ratio (i) is explained hereinafter.

The transmission ratio changing speed (di/dt) is a function of flow rate Q of oil supplied to the chamber 9, and the flow rate Q is a function of the duty ratio D, line pressure PL and primary pressure $P_p$ in the chamber 9, namely:

$$di/dt = F(Q) = F(D, PL, P_p)$$

The line pressure PL is determined by the transmission ratio i and engine torque, and the primary pressure $P_p$ in the chamber 9 is determined by the transmission ratio i and the line pressure PL. Accordingly, assuming the engine torque to be constant, $$di/dt = f(D, i)$$

$$D = f(di/dt, i)$$

Accordingly, the duty ratio is determined by the transmission ratio changing speed di/dt and the transmission ratio i. On the other hand, the transmission ratio changing speed di/dt is dependent on the difference between the actual transmission ratio i and a desired transmission ratio id, $$di/dt = K(id - i)$$

where K is a coefficient.

Accordingly, if the transmission ratio changing speed di/dt is determined, the duty ratio D can be obtained from the speed. When the actual transmission ratio i is larger than the desired transmission ratio id (i>id), the value of di/dt is negative. In such a state, the duty ratio D is increased to reduce the pressure in the chamber 51g so as to upshift the transmission. The downshift is performed in the reverse manner.

The system is arranged to control the transmission ratio in accordance with the above-described principle. In the system, a drive pulley speed sensor 71, a driven pulley speed sensor 72, a throttle valve position sensor 73, and an engine speed sensor 74 are provided. Signals of these sensors are fed to the control unit 70. The control unit 70 produces output pulses, the duty ratios of which are determined by the input signals. The pulses are supplied to the solenoids of the valves 65 and 67 so as to control the line pressure and transmission ratio.

In operation, while the vehicle is at a stop, the duty ratios of the pulses supplied to the valves 65 and 67 are small. Since the duty ratio is small, the pressure at the port 51e of the valve 50 is high. Accordingly, the spool 52 of the valve 50 is at the right end position and the drain port 51c communicates with the chamber 9 through the conduit 23, so that chamber 10 of the driven pulley is supplied with the line pressure through conduit 22b, and the chamber 9 of the drive pulley is drained. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to the axles 18 of the driving wheels 19. Thus, the vehicle is started.

At that time the line pressure is at the highest value by the pressure control valve 40, since the duty ratio for the valve 65 is small, and the spool 42 of the control valve 40 is at the left end position. When the throttle valve is opened for acceleration, the duty ratio increases, so that the pressure in the chamber 51f of the control valve 50 becomes higher than the chamber 51g. Thus, the spool 52 is shifted to the left to communicate the port 51a with port 51b, so that oil is supplied to the chamber 9 through the conduit 23. On the other hand, the duty ratio for the control valve 65 is increased, so that the control pressure at the port 41d of the valve 40 becomes low. The spool 42 of the valve 40 is applied with the line pressure at the port 41c and the control pressure at the port 41d and the force of the spring 43. Since the control pressure reduces, the spool 42 of the valve 40 is shifted to the right. Accordingly, the port 41a is communicated with the port 41b of the drain passage 27. Thus, the line pressure reduces, and the transmission is upshifted, since oil is still supplied to the chamber 9 through the control valve 50. When the opening degree of the throttle valve is reduced for deceleration, the duty ratio is reduced, thereby shifting the spool 52 to the right to drain the chamber 9. Thus, the transmission is downshifted.

Figure 3:
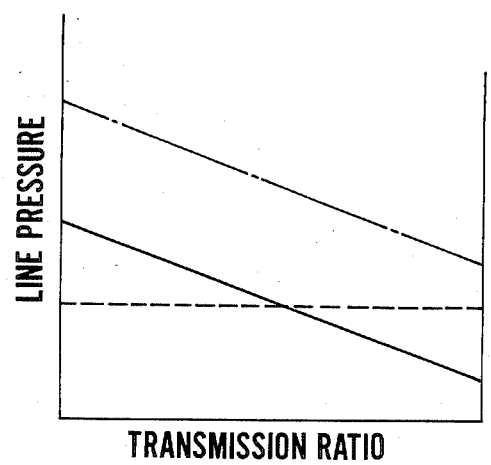
FIG. 3 is a graph showing the relationship between transmission ratio and line pressure.

As the transmission ratio changes, the sensor shoe 46 moves, so that force of the spring 43 of the valve 40 changes. The solid line of FIG. 3 shows the change of line pressure by the change of the spring force. In accordance with the present invention, control pressure is applied to the spool 42 of the valve in addition to the spring force. Accordingly, the width of the control of the line pressure increases as shown by the chain line in FIG. 3. In other words, the control width by the control pressure can be reduced by the aid of the spring force. Accordingly, the influence of temperature on the oil is reduced, so that the line pressure can be controlled without temperature compensating means.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for a continuously variable transmission for transmitting the power of an internal combustion engine, the transmission comprising a drive pulley having a hydraulically shiftable disc and a first hydraulic cylinder for shifting the disc, a driven pulley having a hydraulically shiftable disc and a second hydraulic cylinder for operating the disc of the driven pulley, and a belt engaged with both pulleys, the system comprising a first hydraulic circuit having a pump for supplying oil to the first and second hydraulic cylinders, a line pressure control valve having ports and a first spool and being provided in the first hydraulic circuit to control line pressure of the supplying oil by shifting of the first spool, a transmission ratio control valve having ports and a second spool and being provided in the first hydraulic circuit to control the supplying of the oil to the first hydraulic cylinder so as to control transmission ratio of the transmission, the improvement wherein:

said first hydraulic circuit is connected so as to supply a portion of the oil to an end of the first spool of the line pressure control valve;

a second hydraulic circuit for supplying the oil as control oil to the other end of the first spool of the line pressure control valve so as to shift the first spool;

control valve means provided in the second hydraulic circuit for controlling the amount of the control oil supplied to the other end of the first spool of the line pressure control valve so as to control the line pressure;

sensing means for sensing operating conditions of the engine and the transmission and for producing signals dependent on the conditions;

first means responsive to the signals from the sensing means for producing a control signal for operating the control valve means so as to control the line pressure;

said line pressure control valve has a slidably mounted spring retainer;

a spring provided between the other end of the first spool and said spring retainer; and second means for shifting the spring retainer in accordance with the transmission ratio of the transmission so as to control the line pressure in addition to control of the line pressure by operation of the control valve means.

2. The control system according to claim 1 wherein the control valve means is a solenoid operated on-off valve, and the control signal of the first means is pulses, the duty ratio of which is changed so as to control the line pressure.

3. The control system according to claim 1, wherein the second hydraulic circuit is provided with a pressure control valve for maintaining the pressure of the control oil at a constant value.

4. The control system according to claim 1, wherein said line pressure control valve has a housing defining said ports, and said spring retainer is slidably mounted in said housing.

5. The control system according to claim 1, wherein the second means is a sensor shoe operatively connecting the spring retainer with one of the hydraulically shiftable discs of the pulley.

6. The control system according to claim 5, wherein said second means includes an adjust screw connected to the spring retainer, and another screw axially abutting said adjust screw and connected to said sensor shoe.

7. The control system according to claim 6, wherein said adjust screw is adjustably connected to the spring retainer.

* * * * *